United States Patent [19]

Yanagita et al.

[11] Patent Number: 5,134,027
[45] Date of Patent: Jul. 28, 1992

[54] MAGNETIC RECORDING MEDIUM

[75] Inventors: Takafumi Yanagita; Tsutomu Kempo, both of Hino, Japan

[73] Assignee: Konica Corporation, Tokyo, Japan

[21] Appl. No.: 435,689

[22] Filed: Nov. 13, 1989

[30] Foreign Application Priority Data

Nov. 14, 1988 [JP] Japan .................. 63-288365

[51] Int. Cl.$^5$ ............................. G11B 23/00
[52] U.S. Cl. .................. 428/323; 428/480; 428/694; 428/900
[58] Field of Search ............ 428/408, 694, 900, 323; 427/131

[56] References Cited

U.S. PATENT DOCUMENTS

| | | | |
|---|---|---|---|
| 4,117,190 | 9/1978 | Akoshi et al. | 428/900 |
| 4,135,032 | 1/1979 | Akashi et al. | 428/900 |
| 4,388,360 | 6/1983 | Miyoshi et al. | 428/900 |
| 4,414,270 | 11/1983 | Miyoshi et al. | 428/900 |
| 4,582,757 | 4/1986 | Miyoshi et al. | 428/900 |
| 4,686,139 | 8/1987 | Ryoke et al. | 428/900 |
| 4,696,858 | 9/1987 | Ryoke et al. | 428/900 |
| 5,001,006 | 3/1991 | Saito et al. | 428/329 |

*Primary Examiner*—Paul J. Thibodeau
*Assistant Examiner*—Leszek Kiliman
*Attorney, Agent, or Firm*—Jordan B. Bierman

[57] ABSTRACT

The improved magnetic recording medium having a magnetic layer on one side of a base support and a backcoat containing a binder and a carbon black on the other side is characterized in that the backcoat further contains an inorganic powder having a hardness of 3–6 on the Mohs scale, the carbon black having an average particle size of 20–100 m$\mu$, and the binder containing nitrocellulose having a viscosity of $\frac{1}{8}$–$\frac{1}{3}$ second as measured by the falling-ball method.

19 Claims, No Drawings

MAGNETIC RECORDING MEDIUM

BACKGROUND OF THE INVENTION

The present invention relates to a magnetic recording medium, in particular, one having a back coat with improved surface properties.

Magnetic recording media such as magnetic tape, magnetic sheet and magnetic disk are used extensively in audio, video and computer applications. Video tapes are often encased in cassettes. When recording or reproducing image with video tapes, a cassette is loaded on a video deck and the tape is scanned with the magnetic head as it runs in abrasive contact with guide poles and rollers. For successful image recording and reproduction, the tape must run normally and its winding must be uniform enough to permit cyclic use. Since the tape runs at high speed and because it is usually made of materials having high electrical resistance, the surface properties of the tape which makes abrasive contact with guide poles and rollers are required to be appropriate for tape running and to have antistatic effect.

On the other hand, in order to increase sensitivity and especially to improve the output in the high-frequency range, the magnetic layer of magnetic tape is finished to have a smooth surface so that the tape will maintain a constant state of abrasion with the magnetic head. However, if the surface of the magnetic layer is very smooth, its dynamic frictional resistance increases to cause occasional problems during tape running.

Further, when magnetic tape is caused to run on a video deck, not only its obverse surface but also its reverse surface undergoes abrasion by guide poles and rollers. Therefore, if the running property and the durability of the back surface of the tape are not good, an irregular and sudden tension will be exerted upon the running tape to cause excessive abrasion of the magnetic layer by the head. As a result, not only is the magnetic layer damaged but also the shedding of magnetic particles will occur. In addition, the tension at which the tape is wound varies constantly, causing unevenness in winding pressure and the form in which tape is wound up. As a result, the edges of turns of wound tape becomes nonuniform and this results in uneven running in subsequent use of the tape. All these phenomena contribute to deterioration of image and the electromagnetic characteristics of the tape as typified by skew, jitter and low S/N ratio.

With a view to overcoming these problems, it has been proposed that a back coat be provided on the reverse side of magnetic tape. An example of such proposal is the inclusion of a inorganic powder in a resin layer. This approach is intended to roughen the surface of the back coat so that the area of contact with guide poles and rollers is sufficiently reduced to realize a lower coefficient of friction. For instance, JP-A-57-53825 (the term "JP-A" as used herein means an "unexamined published Japanese patent application") and JP-A-58-2415 show examples of using inorganic powders. However, in these references, the disclosure on Mohs scale of hardness is not made sufficiently, therefore, if such inorganic powder was used in a wrong way, performance of the resulting magnetic tape deteriorates.

The use of carbon black in place of inorganic powders has also been proposed as in JP-B-52-17401 (the term "JP-B" as used herein means an "examined Japanese patent publication"). The technique disclosed in this publication aims at preventing static buildup by the electroconductivity of carbon black, as well as the light-shielding and surface-roughening effects of its particles. However, the carbon black particles used have an average size of 10–20 $\mu$m and hence have very low dispersibility in paints or coating solutions. When a back coat is formed by applying the resulting dispersion, the carbon black particles will agglomerate and produce coarse asperities on the surface. Further, such agglomerated particles adhere so weakly to the binder that they will easily shed off the surface. In addition, when the tape is wound and if adjacent turns contact each other, large agglomerated particles in the back coat of one layer will produce asperities on the magnetic coating of the adjacent layer.

Thus, carbon black particles having a small size are poor in dispersibility and it has been difficult to obtain a back coat that has such a mean roughness as to avoid the formation of asperities on the magnetic coating of an adjacent layer. In other words, the use of such small particles has had a tendency to produce an excessively coarse surface.

In an attempt to reduce the frictional resistance of back coats, it has been proposed that a carbon black powder having a fairly small average primary particle size of 10–60 $\mu$m be used in combination with a carbon black powder having an average primary particle size of more than 100 $\mu$m (see, for example, JP-A-60-45938, JP-A-60-25023, JP-A-59-185027 and JP-A-59-223937. However, satisfactory improvements could not be achieved in running property and durability by merely combining carbon black powders of different particle sizes.

It has also been proposed that synergism be realized by using an inorganic powder in combination with carbon black (see JP-A-59-210534, JP-A-60-25022 and JP-60-25023) but, in this approach, particle size of the carbon black and the Mohs scale of hardness of the inorganic powder must be selected so as to adapt one to the other.

The binder to be used in back coats is no less important than that used in the magnetic layer and involves many factors to be taken into account such as strength, adhesion to fillers, its ability to disperse fillers, surface properties and ease of handling, in particular, the applicability of coating solutions that contain it. In current practice, the binders used in the magnetic layer is simply applied to the back coat and in the absence of thorough reviews on binders that are particularly suitable for use in the back coat, there is a high likelihood that the back coat which is deliberately provided to improve the characteristics of magnetic recording media will simply add to the chance of increased occurrence of defects in the media. To take nitrocellulose as an exemplary binder, the dispersibility of fillers is reduced if the molecular weight of nitrocellulose is high and agllomeration will occur. If, on the other hand, the molecular weight of nitrocellulose is low, the dipersibility of the filler is satisfactory but then it is not durable and will easily shed off.

SUMMARY OF THE INVENTION

An object, therefore, of the present invention is to provide a magnetic recording medium having the following advantageous features: (1) it has a back coat that is small in dynamic frictional coefficient, that reduces the deck tension of tape, and that will not damage tape even if it is caused to run repeatedly; (2) the dispersion of which the back coat is made is highly uniform and the surface roughness of the back coat can be sufficiently reduced to prevent its transfer onto the magnetic coating of an adjacent layer; and (3) said recording medium has a good chroma S/N characteristic.

The above-stated object of the present invention can be attained by a magnetic recording medium having a magnetic layer on one side of a base support and a back coat containing a binder and a carbon black on the other side, which recording medium is characterized in that the back coat further contains an inorganic powder having a hardness of 3-6 on the Mohs scale, that the carbon black has an average particle size of 20-100 mµ, and that the binder contains nitrocellulose having a viscosity of ⅛-⅝ second as measured by the falling-ball method.

DETAILED DESCRIPTION OF THE INVENTION

The back coat of the magnetic recording medium of the present invention contains a carbon black having an average particle size of 20-100 mµ. In a preferred embodiment, said carbon black consist of particles having an average primary particle size of 20-40 mµ and those having an average primary particle size of 50-100 mµ. If the average particle size of carbon black exceeds 100 mµ, the resulting backcoat will have an excessive surface roughness, which may be transferred onto the magnetic coating of an adjacent layer to impair its electromagnetic characteristics. If the average particle size of carbon black is less than 20 mµ, a uniform dispersion will not be formed and agglomerated particles may shed off to cause occasional dropouts (D/O).

The carbon black to be used in the present invention may have a single peak in the particle size distribution but it is preferred to use two or more kinds of carbon black particles having different peaks in size distribution.

The following are specific examples of fine carbon black powders having an average particle size of 20-40 mµ: Raven 5250, 1255, 1250, 1200, 1170, 1040, 1035, 1030, 1020, 890, 850 and 825 of Columbia Carbon Corp.; Black Pearls L, Regal 400, 600, 500R, 500, 330, 99, Vulcan XC-72 and Vulcan P of Cabot Corp.; and CF9, 50, 52, 45, 44, 40, 32, 30, 4000 and MA-100, 7, 8 and 11 of Mitsubishi Kasei Corp.

Specific examples of coarser carbon black powders having an average primary particle size of 50-100 mµ are Raven 14, 410, 420, 430 and 450 of Columbia Carbon Crop.

The term "average primary particle size" as used herein means the value obtained by the following method: measuring the size of individual particles in a freshly prepared lot under an electron microscope; totaling the measured values; and dividing the sum by the number of particles measured.

The fine and coarse carbon black particles incorporated in the back coat may be mixed at weight proportions ranging from 50:1 to 1:3, preferably from 20:1 to 1:2. The carbon black particles are preferably contained in the back coat in an amount of 10 to 90 wt. %.

Examples of the inorganic powder having a hardness of 3-6 on the Mohs scale that may be incorporated in the back coat include titanium oxide, zinc oxide, calcium carbonate, barium sulfate, $\alpha$-$Fe_2O_3$, etc. Among the inorganic powders listed above, zinc oxide particles are preferred, with those having a size of 0.5-1.0 µm being particularly preferred. If the hardness of inorganic particles exceeds 6 on the Mohs scale, the surface roughness of the back coat will be transferred extensively onto the magnetic coating of an adjacent layer. Further, such hard particles will wear ball mills and other devices used to prepare coating solutions, and worn particles working as impurities may cause problems such as dropout. If the hardness of inorganic paraticles is less than 3 on the Mohs scale, they are no longer effective in providing a strong film; on the contrary, they sometimes reduce the strength of back coat.

Zinc oxide which is preferably used in the present invention may be prepared by either the dry or wet method. Zinc oxide of a non-single form prepared by the French process is particularly preferred.

The particle size of zinc oxide to be used in the present invention is expressed by the value determined by the air permeation method which, using the relationship between the specific surface area of a powder comprised of spherical primary particles and the passage of a fluid (air) through a bed filled with said powder, calculates the average particle size of the powder by the following Kozeny-Carman equation (1):

$$SW = \frac{14}{\rho} \sqrt{\frac{\Delta P A t}{\eta L Q} \frac{\epsilon^3}{(1-\epsilon)^2}} \quad (1)$$

Provided $$\epsilon = 1 - \frac{W}{\rho A L}$$

where SW: the specific surface area of the powder ($cm^2/g$);
$\epsilon$: the porosity of the powder-filled bed;
$\rho$: the density of the powder ($g/cm^3$);
$\eta$: the viscosity coefficient of air (g/cm.sec);
L: the thickness of the powder-filled bed (cm);
Q: the amount of air permeating through the powder-filled bed (cc);
$\Delta P$: the differential pressure across the powder-filled bed ($g/cm^2$);
A: the cross-sectional area of the powder-filled bed ($cm^2$);
t: the time required for Qcc of air to permeate through the powder-filled bed (sec); and
W: the weight of the powder (g).

Since $\rho$, $\eta$, L, A and $\epsilon$ can be measured independently of one another, one may substitute Q and t into equation (1) and then measure the resulting $\Delta P$ to determine Sw. By substituting the determined value of Sw into the following equation (2), the average particle size, dm, can be calculated:

$$dm = \frac{6}{\rho S w} \quad (2)$$

A typical apparatus that can be used to implement this "air permeation method" is a Model SS-100 of Shimadzu Corp.

In preparing a coating solution for the back coat of the present invention, the ratio of the inorganic powder to the carbon black is generally in the range of from 2.0 to 0.01, preferably from 1.0 to 0.05, on a weight basis. The total amount of filler including the carbon black and the inorganic powder generally ranges from 50 to 500 parts, preferably from 60 to 400 parts, per 100 parts by weight of binder.

An organic filler may be used in combination with the carbon black and the inorganic powder and preferred organic fillers are acrylic styrene resins, benzoguanamine resin powders, melamine resin powders and phthalocyanine resin powders, and more specific examples include polyolefinic resin powders, polyester resin powders, polyamide resin powders, polyimide resin powders and poly (ethylene fluoride) resin powders. Particularly preferred organic fillers that may be used in combination with carbon black are benzoguanamine and/or melamine resin powders.

In the present invention, nitrocellulose is used as a binder in the back coat. An optimum range for the molecular weight of nitrocellulose may be defined in terms of viscosity and is specified to lie between $\frac{1}{8}$ and $\frac{1}{4}$ second as measured by the falling-ball method. A particularly preferred range is from $\frac{1}{4}$ to $\frac{1}{3}$ second.

The falling-ball method as employed in the present invention consists of the following steps: preparing a solution of nitrocellulose in solvent according to the recipe shown below; filling a vertical tube (i.d. 1 in; L, 14 in) with this nitrocellulose solution; dropping a steel ball (5/16 in$\phi$) in the tube at 25° C.; and measuring the time required for the ball to fall down the center of the tube by a distance of 10 in. The measuring apparatus is a viscometer available from Hercules Powder, Inc. Nitrocellulose solution in solvent:

| Nitrocellulose | 12.2 wt % |
| --- | --- |
| 95% Ethanol | 22.0 wt % |
| 99% ethyl acetate | 17.5 wt % |
| Benzene | 48.3 wt % |

A polyurethane resin may be used in combination with the nitrocellulose in the back coat. Through the proper choice of polyol, the polyurethane resin to be used in the present invention may be modified to contain an ether bond, a common ester bond having a vicinal carbon atom, a carbonate ester bond or mixtures thereof in addition to the urethane bonds in the backbone chain of the resin. Further, fluorine, silicon or sulfo group may be introduced into the backbone chain or side chains for the purpose of providing improved lubricating or dispersing effects. The nitrocellulose to be used in the present invention preferably has a molecular weight in the range of $500-2 \times 10^5$.

The polyurethane resin and the cellulosic resin may be mixed at a ratio generally ranging from 0.05 to 10.0, preferably from 0.1 to 5.0, on a weight basis.

By using nitrocellulose having the thus specified molecular weight, improved dispersing ability, heat resistance, toughness and anti-blocking property can be attained. Further, the resulting back coat has a reduced frictional coefficient and exhibits an outstanding effect in preventing adjacent layers from sticking to each other. A particularly significant advantage is that consistent tape running is insured in a hot and humid atmosphere.

As for the production rate, coating solutions containing nitrocellulose have the advantage that fillers can be dispersed more quickly than when vinyl chloride compounds are used and that the coating solutions themselves are stable with little chance of the reagglomeration of filler particles.

In the present invention, a polyisocyanate may be contained as a curing agent for the binder. Useful aromatic polyisocyanates are tolylene diisocyanate (TDI) and addition products of polyisocyanates and active hydrogen compounds. Advantageous aromatic polyisocyanates are those having average molecular weights in the range of from 100 to 3000. Useful aliphatic polyisocyanates are hexamethylene diisocyanate (HMDI) and addition products of isocyanates and active hydrogen compounds. Among these aliphatic polyisocyanates and addition products of polyisocyanate and active hydrogen compounds are those which have molecular weights in the range of from 100 to 3000. Particularly preferred aliphatic polyisocyanates are non-alicyclic polyisocyanates and addition products of these compounds with active hydrogen compounds.

The polyisocyanates described above may be added in amounts ranging from 1/20 to 7/10, preferably from 1/10 to $\frac{1}{2}$, of the weight of the binder.

The coefficient of friction between the back coat and the magnetic coating of an adjacent layer is preferably no greater than 0.27. If the coefficient exceeds 0.27, cinching occurs to cause occasional shedding of the back coat or abnormal tape running.

In order to insure good running property and electromagnetic conversion characteristics, the back coat provided in the present invention preferably has a surface roughness of up to 0.05 µm, more preferably 0.01–0.03 µm, in terms of center-line-average roughness (Ra) at a cut-off value of 0.08 mm.

Illustrative dispersants that can be used in the back coat include lecithin, phosphate esters, amine compounds, alkyl sulfates, aliphatic acid amides, higher alcohols, polyethylene oxide, sulfosuccinic acid, sulfosuccinate esters, known surfactants and salts of these compounds. Salts of polymeric dispersants having anionic organic groups (e.g. —COOH and —PO$_3$H) may also be used. These dispersants may be used either on their own or as admixtures. These dispersants are generally added in amounts ranging from 1 to 20 parts by weight per 100 parts by weight of binder.

Antistats that may be used in the present invention are exemplified below: electroconductive powders such as the carbon black described herein, graphite, tin oxide-antimony oxide compounds, and titanium oxide-tin oxide-antimony oxide compounds; natural surfactants such as saponin; nonionic surfactants such as alkylene oxide compounds, glycerin compounds and glycidol compounds; cationic surfactants such as higher alkylamines, quaternary ammonium salts, pyridine and other heterocyclic compounds, phosphonium compounds, and sulfonium compounds; anionic surfactants containing acidic groups such as carboxylic acid group, sulfonic acid group, phosphoric acid group, sulfate ester and phosphate ester groups; and amphoteric surfactants such as amino acids, aminosulfonic acids, as well as sulfate or phosphate esters of amino alcohols.

Another unique feature about the magnetic recording medium of the present invention is that it does not use common lubricants. If known lubricants are used, the frictional coefficient of the back coat increases and the resulting higher torque will cause abnormal tape running and lead to lower endurance.

The coating solution for back coat formulated as described above is applied to give a dry thickness of 0.1–2.0 µm, preferably 0.2–1.5 µm.

In another preferred embodiment of the present invention, a first blend obtained by mixing the binder described above with the fine carbon black powder having an average primary particle size of 20–40 mμ, a second blend obtained by mixing the binder with the coarse carbon black having an average primary particle size of 50–100 mμ, and a third blend obtained by mixing the binder with the inorganic powder are mixed to prepare a coating solution of back coat, which is applied to the back side of a base support. By so doing, the individual particles can be dispersed very uniformly.

In this preferred embodiment, carbon black powders and inorganic powders having different levels of dispersability are separately mixed with the binder, so most optimum conditions for disparsing the respective powders can be selected when mixing them with the binder. Further, two types of carbon black powders having different primary particles sizes are separately mixed with the binder, so most optimum conditions for dispersing the respective carbon black powders can be selected when mixing them with the binder. Accordingly, the three components which are throroughly dispersed in the binder can be subsequently mixed together to prepare a desired coating solution for the back coat, and by applying this coating solution, a back coat comprising a uniform dispersion can be formed without producing any agglomerated particles.

In implementing this preferred embodiment, the following specific methods may be employed. In a first method, carbon blacks A and B are individually mixed with a binder to form blends 1 and 2; in a separate step, an inorganic powder is mixed with a binder to form a blend 3; these mixtures may be formed simultaneously or in different steps; then, blends 1, 2 and 3 are mixed together and a dispersion is formed to prepare a coating solution for back coat, which is applied to the back side of a base support. In a second method, carbon blacks A and B and the inorganic powder are individually mixed with a binder and the resulting three blends are processed to form dispersions; the so obtained dispersions are then mixed together to prepare a coating solution for back coat, which is applied to the back side of a base support.

In performing either method, various types of kneaders (e.g., continuous kneader, open kneader and pressure kneader) and roll mills (e.g., twin-roll mill and triple roll mill) may be used as mixing devices. Dispersions can be formed by known devices such as ball mills and sand mills. The coating solution in the form of a dispersion may be passed through a device such as an inline mixer before it is supplied to applicators such as a gravure roll coater, a reverse roll coater and an extrusion coater.

The magnetic layer in the recording medium of the present invention may be of a coated type formed by using a magnetic powder, a binder, a dispersant, a lubricant, etc. or of a thin-film type formed by such techniques as evaporation, sputtering and vapor deposition. Various ferromagnetic materials may be used as selected from among oxide magnetic materials such as γ-Fe$_2$O$_3$, Co-doped γ-Fe$_2$O$_3$, Co-coated γ-Fe$_2$O$_3$, Fe$_3$O$_4$, Co-doped Fe$_3$O$_4$, Co-coated Fe$_3$O$_4$ and CrO$_2$; and metallic magnetic particles based on Fe, Ni, Co or Al as exemplified by Fe, Ni, Co, Fe-Ni alloys, Fe-Co alloys, Fe-Al alloys, F-Al-Ni alloys, Fe-Ni-P alloys, Fe-Ni-Co alloys, Fe-Mn-Zn alloys, Fe-Ni-Zn alloys, Fe-Co-Ni-Cr alloys, Fe-Co-Ni-P alloys, Co-Ni alloys, Co-P alloys, and Co-Cr alloys. These metallic magnetic particles may contain such additives as Si, Cu, Zn, Al, P and Cr in either elemental or compound form. Hexagonal ferrite such as barium ferrite, as well as iron nitride can also be used.

Binders, curing agents, dispersants, antistats, lubricants, abrasives and fillers to be incorporated in the magnetic layer may be selected from among known compounds.

The solvents to be incorporated in the coating solutions for back coat and magnetic layer and the diluting solvents to be used in applying such coating solutions may be selected from among various known solvents as listed below: ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and ethylene glycol monoacetate; ethers such as glycol dimethyl ether, glycol monoethyl ether, dioxane and tetrahydrofuran; aromatic hydrocarbons such as benzene, toluene and xylene; and halogenated hydrocarbons such as methylene chloride, ethylene chloride, carbon tetrachloride, chloroform and dichlorobenzene.

Exemplary support materials that can be used in the present invention include: polyesters such as polyethylene terephthalate and polyethylene-2,6-naphthalate; polyolefins such as polypropylene; cellulose derivatives such as cellulose triacetate and cellulose diacetate; and plastics such as polyamides and polycarbonates. Also usable are metals (e.g. Cu, Al and Zn), glass, boron nitride, silicon carbide and ceramics.

Base supports made of these materials have thicknesses of from about 3 to 100 μm, preferably 5–50 μm, if they are in a film or sheet form, and thicknesses of from about 30 μm to 10 mm if they are in a disk or card form. Drum-shaped supports are cylindrical. The specific type of support is determined by the recorder used.

An intermediate layer may be provided between the support and the back coat or the magnetic layer in order to improve the adhesion between the two members.

The layers described above may be formed by various application methods which include, but are not limited by, air doctor coating, blade coating, air-knife coating, squeeze coating, dip coating, reverse roll coating, transfer roll coating, gravure coating, kiss coating, cast coating and spray coating.

The following examples are provided for the purpose of further illustrating the present invention but are not to be taken as limiting.

EXAMPLE 1

The ingredients of Recipe I (see below) for magnetic paint were thoroughly mixed and dispersed with a ball mill. After adding 6 parts of a polyfunctional isocyanate as a curing agent, the paint was passed through a 1-μm filter and applied to polyethylene terephthalate bases (13 μm thick) with a reverse roll coater to form a magnetic layer in a dry thickness of 4.5 μm. The resulting film specimens were supercalendered.

In a subsequent step, the ingredients of Recipe II (for back coat paint) described in Table 1 below were dispersed with a ball mill for 24 h to prepare backcoat paints for various samples. The paints were applied to the back side of the previously prepared film specimens to give a dry thickness of 1.0 μm by means of a reverse roll coater and dried. After thus forming a backcoat, the specimens were slit to a width of ½ in, thereby fabricating tape samples Nos. 1–11 of the present invention and comparative tape sample Nos. 1–8. Sample No. 11 was prepared in the same manner as in Sample No. 8 except that separately prepared blends a, b and c were mixed in the amounts shown in Table 1 below.

RECIPE I (MAGNETIC PAINT)

| Component | Parts by weight |
|---|---|
| Co-doped γ-Fe₂O₃ | 100 |
| Polyurethane | 8 |
| Vinyl chloride-vinyl acetate copolymer | 12 |
| Butyl stearate | 0.8 |
| Myristic acid | 0.5 |
| Stearic acid | 0.5 |
| Alumina | 5 |
| Carbon black | 0.5 |
| Lecithin | 4 |
| Cyclohexanone | 40 |
| Methyl ethyl ketone | 60 |
| Toluene | 60 |

TABLE 1

(parts by weight)

| | | | Examples | | | | | | | | | | 11 | | |
|---|---|---|---|---|---|---|---|---|---|---|---|---|---|---|---|
| | | | 1 | 2 | 3 | 4 | 5 | 6 | 7 | 8 | 9 | 10 | a | b | c |
| Polyurethane resin ("Nipporan 2304" of Nippon Polyurethane industry Co., Ltd.) | | | 50 | 50 | 50 | 50 | 50 | 50 | 50 | 50 | 50 | 50 | 20 | 20 | 10 |
| Nitrocellulose (viscosity in seconds) | 1/1 | | — | — | — | — | — | — | — | — | — | — | — | — | — |
| | ½ | | — | — | — | — | — | 50 | — | — | — | — | — | — | — |
| | ¼ | | 50 | 50 | 50 | 50 | 50 | — | — | 50 | 50 | 50 | 20 | 20 | 10 |
| | ⅛ | | — | — | — | — | — | — | 50 | — | — | — | — | — | — |
| | 1/16 | | — | — | — | — | — | — | — | — | — | — | — | — | — |
| Polyisocyanate ("Collonate L" of Nippon Polyurethane industry Co., Ltd.) | | | 20 | 20 | 20 | 20 | 20 | 20 | 20 | 20 | 20 | 20 | — | — | — |
| Carbon black (particle size in mμ) | 10 | | — | — | — | — | — | — | — | — | — | — | — | — | — |
| | 27 | | 80 | — | — | — | — | — | — | 50 | 40 | 55 | 50 | — | — |
| | 40 | | — | 80 | — | — | 80 | 80 | 80 | — | — | — | — | — | — |
| | 70 | | — | — | 80 | — | — | — | — | 30 | 20 | 35 | — | 30 | — |
| | 100 | | — | — | — | 80 | — | — | — | — | — | — | — | — | — |
| | 120 | | — | — | — | — | — | — | — | — | — | — | — | — | — |
| Inorganic powder | particle size (μm) | hardness on Mohs scale | 20 | 20 | 20 | 20 | — | 20 | 20 | 20 | 40 | 10 | — | — | 20 |
| ZnO | 0.5 | 4 | | | | | | | | | | | | | |
| TiO | 0.5 | 6 | — | — | — | — | 20 | — | — | — | — | — | — | — | — |
| Talc | 0.5 | 2 | — | — | — | — | — | — | — | — | — | — | — | — | — |
| SiO₂ | 0.5 | 7 | — | — | — | — | — | — | — | — | — | — | — | — | — |
| Toluene | | | 800 | 800 | 800 | 800 | 800 | 800 | 800 | 800 | 800 | 800 | 300 | 300 | 200 |
| Methyl ethyl ketone | | | 1200 | 1200 | 1200 | 1200 | 1200 | 1200 | 1200 | 1200 | 1200 | 1200 | 500 | 500 | 200 |

| | | | Comparative Examples | | | | | | | |
|---|---|---|---|---|---|---|---|---|---|---|
| | | | 1 | 2 | 3 | 4 | 5 | 6 | 7 | 8 |
| Polyurethane resin ("Nipporan 2304" of Nippon Polyurethane industry Co., Ltd.) | | | 50 | 50 | 50 | 50 | 50 | 50 | 50 | 50 |
| Nitrocellulose (viscosity in seconds) | 1/1 | | — | — | 50 | — | — | — | — | — |
| | ½ | | — | — | — | — | — | — | — | — |
| | ¼ | | 50 | 50 | — | — | 50 | 50 | 50 | 50 |
| | ⅛ | | — | — | — | — | — | — | — | — |
| | 1/16 | | — | — | — | 50 | — | — | — | — |
| Polyisocyanate ("Collonate L" of Nippon Polyurethane industry Co., Ltd.) | | | 20 | 20 | 20 | 20 | 20 | 20 | 20 | 20 |
| Carbon black (particle size in mμ) | 10 | | 80 | — | — | — | — | — | 50 | — |
| | 27 | | — | — | — | — | — | — | — | 50 |
| | 40 | | — | — | 80 | 80 | 80 | 80 | — | — |
| | 70 | | — | — | — | — | — | — | 30 | — |
| | 100 | | — | — | — | — | — | — | — | — |
| | 120 | | — | 80 | — | — | — | — | — | 30 |
| Inorganic powder | particle size (μm) | hardness on Mohs scale | 20 | 20 | 20 | 20 | — | — | 20 | 20 |
| ZnO | 0.5 | 4 | | | | | | | | |
| TiO | 0.5 | 6 | — | — | — | — | — | — | — | — |
| Talc | 0.5 | 2 | — | — | — | — | 20 | — | — | — |
| SiO₂ | 0.5 | 7 | — | — | — | — | — | 20 | — | — |
| Toluene | | | 800 | 800 | 800 | 800 | 800 | 800 | 800 | 800 |
| Methyl ethyl ketone | | | 1200 | 1200 | 1200 | 1200 | 1200 | 1200 | 1200 | 1200 |

Various characteristics of the samples thus prepared were measured and the results are shown in Table 2.

TABLE 2

|  |  | BC dynamic frictional coefficient | | Tape after 200 passes | | (BC: back coat) |
|---|---|---|---|---|---|---|
|  |  | Virgin tape | Tape after 200 passes | BC wear | Tape damage | Output variation (dB) |
| Examples | 1 | 0.15 | 0.18 | minimum | none | 0.2 |
|  | 2 | 0.14 | 0.16 | minimum | minimum | 0.3 |
|  | 3 | 0.13 | 0.15 | none | minimum | 0.1 |
|  | 4 | 0.11 | 0.12 | none | none | 0.2 |
|  | 5 | 0.13 | 0.15 | none | minimum | 0.2 |
|  | 6 | 0.15 | 0.17 | none | none | 0.2 |
|  | 7 | 0.14 | 0.16 | minimum | minimum | 0.3 |
|  | 8 | 0.15 | 0.17 | none | none | 0.2 |
|  | 9 | 0.11 | 0.14 | none | none | 0.2 |
|  | 10 | 0.15 | 0.16 | minimum | none | 0.3 |
|  | 11 | 0.13 | 0.14 | none | none | 0.1 |
| Comparative Examples | 1 | 0.17 | — | — | — | — |
|  | 2 | 0.11 | 0.13 | none | much | 2.5 |
|  | 3 | 0.15 | 0.25 | much | some | 1.5 |
|  | 4 | 0.12 | 0.16 | much | little | 0.5 |
|  | 5 | 0.13 | 0.18 | much | little | 0.5 |
|  | 6 | 0.12 | 0.13 | minimum | some | 2.0 |
|  | 7 | 0.15 | 0.22 | much | some | 2.0 |
|  | 8 | 0.12 | 0.13 | minimum | little | 0.5 |

Sample Nos. 1-11 which contained both carbon black and zinc oxide in accordance with the present invention had small frictional coafficients both in the virgin state and after 200 passes. They also experienced very small amounts of back coat wear and tape damage. Further, they were capable of consistent running. Becaue of high uniformity of dispersion it had, the back coat of each of these samples was very low in surface roughness and this enabled sample Nos 1-11 to exhibit satisfactory endurance in repeated running.

On the other hand, comparative sample Nos. 1-8 which did not contain the combination of carbon black and inorganic powder in accordance with the present invention had high frictional coefficients and were not capable of consistent running. Further, they were poor in resistance to back coat wear.

METHODS OF MEASUREMENT (a) Output variation: The tape was loaded into a VHS cassette and allowed to run for 200 continuous passes on a video deck Model NV-6200 (Matsushita Electric Industrial Co., Ltd.) at 20° C. and 60% r.h. The resulting rf output variation was measured.

(b) Tape damage and back coat wear: The tape surface was visually checked after 200 passes.

(c) Dynamic frictional coefficient: The apparatus used was a running tester Model TBT-300-D of Yokohama Systems Co., Ltd. In an atmosphere of 23° C. and 60% r.h., the entrance tension was set at 20 g and the tape wound onto a 3.8 mm$\phi$ stainless steel pin by 180° was caused to run at a speed of 3.3 cm/sec. One minute later, the exit tension was measured. The dynamic frictional coefficient was calculated by the following formula (1)

$$\mu = \frac{1}{n} \ln \left( \frac{\text{exit tension}}{\text{entrance tension}} \right) \quad (1)$$

What is claimed is:

1. A magnetic recording medium having a magnetic layer on one side of a base support and a back coat containing a binder and a carbon black on the other side wherein said back coat further contains an inorganic powder having a hardness of 3-6 on the Mohs scale, said carbon black having an average particle size of 20-100 m$\mu$, and said binder containing nitrocellulose having a viscosity of $\frac{1}{8}$-$\frac{1}{2}$ second as measured by the falling-ball method.

2. A magnetic recording medium according to claim 1 wherein the coefficient of interlaminar friction between said back coat and said magnetic layer is no more than 0.27.

3. A magnetic recording medium according to claim 1 wherein said carbon black consists of particles having an average primary particle size of 20-40 m$\mu$ and those having an average primary particle size of 50-100 m$\mu$.

4. A magnetic recording medium according to claim 3 which is prepared by coating the back side of the base support with a coating solution for back coat that is formed by mixing a first, a second and a third blend, said first blend being prepared by mixing said carbon black having an average primary particle size of 20-40 m$\mu$ with a binder, said second blend being prepared by mixing said carbon black having an average particle size of 50-100 m$\mu$ with a binder, and said third blend being prepared by mixing said inorganic powder with a binder.

5. A magnetic recording medium according to claim 3 wherein said carbon black having an average primary particle size of 20-40 m$\mu$ and said carbon black having an average primary particle size of 50-100 m$\mu$ are mixed at a weight ratio of 50/1 to $\frac{1}{3}$.

6. A magnetic recording medium according to claim 3 wherein said carbon black having an average primary particle size of 20-40 m$\mu$ and said carbon black having an average primary particle size of 50-100 m$\mu$ are mixed at a weight ratio of 20/1 to $\frac{1}{2}$.

7. A magnetic recording medium according to claim 1 wherein said carbon black is incorporated in the back coat in an amount of from 10 to 90 wt. %.

8. A magnetic recording medium according to claim 1 wherein said inorganic powder is a zinc oxide powder having an average particle size of 0.5-1.0 $\mu$m.

9. A magnetic recording medium according to claim 8 wherein said zinc oxide is of a non-singular form produced by the French process.

10. A magnetic recording medium according to claim 1 wherein the weight ratio of said inorganic powder to said carbon black is in the range of from 2.0 to 0.01.

11. A magnetic recording medium according to claim 1 wherein the weight ratio of said inorganic powder to said carbon black is in the range of from 1.0 to 0.05.

12. A magnetic recording medium according to claim 1 wherein the total amount of the fillers in said backcoat is in the range of from 50 to 500 parts by weight per 100 parts by weight of the binder.

13. A magnetic recording medium according to claim 1 wherein said nitrocellulose has a viscosity of $\frac{1}{4}$ to $\frac{1}{8}$ second as measured by the falling-ball method.

14. A magnetic recording medium according to claim 1 wherein said binder is the combination of said nitrocellulose and a polyurethane resin.

15. A magnetic recording medium according to claim 1 wherein said back coat contains a polyisocyanate as a curing agent.

16. A magnetic recording medium according to claim 1 wherein the surface of said back coat has a center-line-average roughness (Ra) of no more than 0.05 μm at a cutoff value of 0.08 mm.

17. A magnetic recording medium according to claim 1 wherein said back coat does not contain a lubricant.

18. A magnetic recording medium according to claim 1 wherein said back coat has a thickness of 0.1-2.0 μm.

19. The medium of claim 1 wherein said inorganic powder is at least one material selected from the group consisting of titanium oxide, zinc oxide, calcium carbonate, barium sulfate, and $\alpha\text{-}Fe_2O_3$.

* * * * *